United States Patent
Cantwell

(10) Patent No.: US 6,594,690 B2
(45) Date of Patent: *Jul. 15, 2003

(54) NETWORK PERIPHERAL DEVICE DRIVER INSTALLER

(75) Inventor: Charles E. Cantwell, Boise, ID (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,637

(22) Filed: Feb. 24, 1999

(65) Prior Publication Data

US 2002/0147795 A1 Oct. 10, 2002

(51) Int. Cl.7 .............................................. G06F 13/14
(52) U.S. Cl. ....................................... 709/217; 709/219
(58) Field of Search .................................. 709/217, 219, 709/321; 710/8, 62; 713/201; 717/11, 178

(56) References Cited

U.S. PATENT DOCUMENTS

| | | | | |
|---|---|---|---|---|
| 5,838,916 A | * | 11/1998 | Domenikos et al. | 709/219 |
| 5,968,136 A | * | 10/1999 | Saulpaugh et al. | 710/3 |
| 5,995,756 A | * | 11/1999 | Herrmann | 717/178 |
| 6,009,480 A | * | 12/1999 | Pleso | 710/8 |
| 6,023,585 A | * | 2/2000 | Perlman et al. | 717/11 |
| 6,074,434 A | * | 6/2000 | Cole et al. | 717/11 |
| 6,115,741 A | * | 9/2000 | Domenikos et al. | 709/217 |
| 6,139,177 A | * | 10/2000 | Venkatraman et al. | 700/83 |
| 6,148,346 A | * | 11/2000 | Hanson | 709/321 |
| 6,192,477 B1 | * | 2/2001 | Corthell | 713/201 |
| 6,256,668 B1 | * | 7/2001 | Slivka et al. | 709/220 |
| 6,260,078 B1 | * | 7/2001 | Fowlow | 709/332 |
| 6,351,487 B1 | * | 2/2002 | Lu et al. | 375/225 |
| 2002/0161939 A1 | * | 10/2002 | Kim et al. | 710/8 |

* cited by examiner

Primary Examiner—N. Le
Assistant Examiner—Walter Benson

(57) ABSTRACT

A system and method install a device driver for a device. A browser is used to browse to a website where a driver resides. The browser downloads executable code. Either the browser or a user provides the executable code information about the device. The executable code builds a list of available drivers for the device from the drivers stored at the driver website. Either the executable code or a user selects a driver from the list of drivers for the device. The executable code downloads the selected driver and stores it locally. The executable code then installs the selected driver.

14 Claims, 2 Drawing Sheets

NETWORK PERIPHERAL DEVICE DRIVER INSTALLER

FIELD OF THE INVENTION

This invention relates in general to peripheral device driver technology and, more particularly, to a system and method for installing a device driver from a website.

BACKGROUND OF THE INVENTION

Most modern operating systems lay the burden of providing device drivers on the device vendors. Device drivers are software that allow the operating system to communicate with and control hardware devices. Typical hardware devices which require device drivers include printers, scanners, and storage devices.

When a user wishes to communicate with a new device from a client, a driver must first be obtained, installed on the client, and configured. Only after this process has been completed may the client use the device within the context of the client's operating system.

This process is further complicated when the operating system of the client requires additional software that allows the device driver to properly communicate with the operating system. Before installing device drivers, the required communication software must be installed on the client.

The process of obtaining all of the required software and drivers then installing and configuring each is often cumbersome and intimidating for a typical computer user.

SUMMARY OF THE INVENTION

According to principles of the present invention, a system and method install a device driver for a device. A browser is used to browse to a website where a driver resides. The browser downloads executable code. Either the browser or a user provides the executable code information about the device. The executable code builds a list of available drivers for the device from the drivers stored at the driver website. Either the executable code or a user selects a driver from the list of drivers for the device. The executable code downloads the selected driver and stores it locally. The executable code then installs the selected driver.

According to further principals of the present invention, the executable code also installs all required software for allowing communication with the device.

Other objects, advantages, and capabilities of the present invention will become more apparent as the description proceeds.

DETAILED DESCRIPTION OF THE INVENTION

Figure 1:
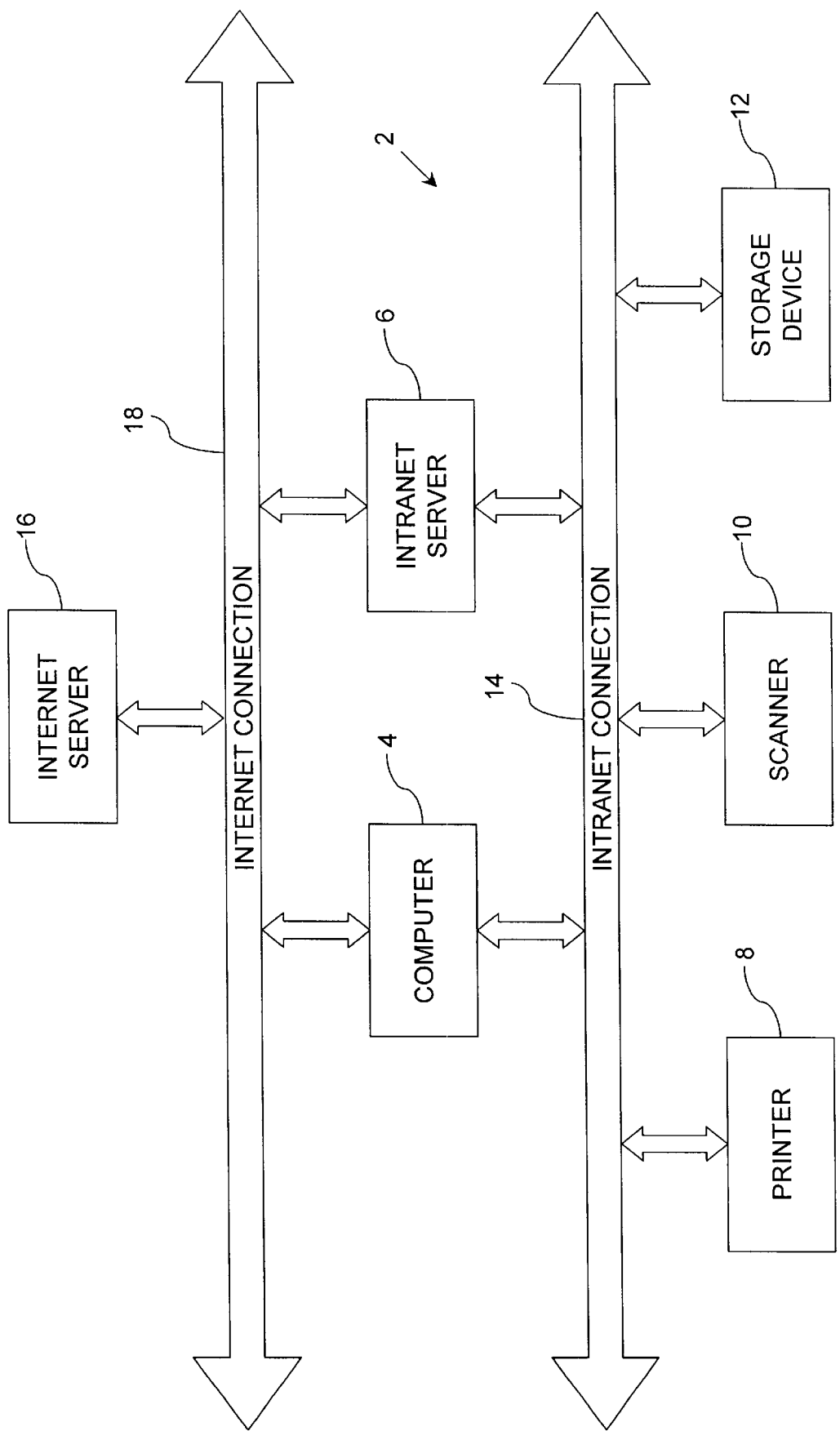
FIG. 1 is a block diagram illustrating typical network connections upon which the present invention may operate

FIG. 1 shows a typical intranet system 2. A computer 4 communicates with an intranet server 6 and network devices 8, 10, 12 through an intranet connection 14. Computer 4 is often referred to as a network client or simply as a client. Network devices 8, 10, 12 may be any network devices capable of communicating through a network connection. For example, network device 8 may be a printer, network device 10 may be a scanner, and network device 12 may be a storage device.

Computer 4 also may communicate with internet server 16 through internet connection 18. In addition, intranet server 6 may communicate with internet server 16 through internet connection 18. It is desirable, but not necessary, for at least one of computer 4 and intranet server 6 to communicate with internet server 16.

Device drivers may either be stored at a website on intranet server 6 or internet server 16. If the device drivers are stored on intranet server 6, the device drivers may have previously been retrieved from internet server 16 through internet connection 18 or any other means.

Figure 2:
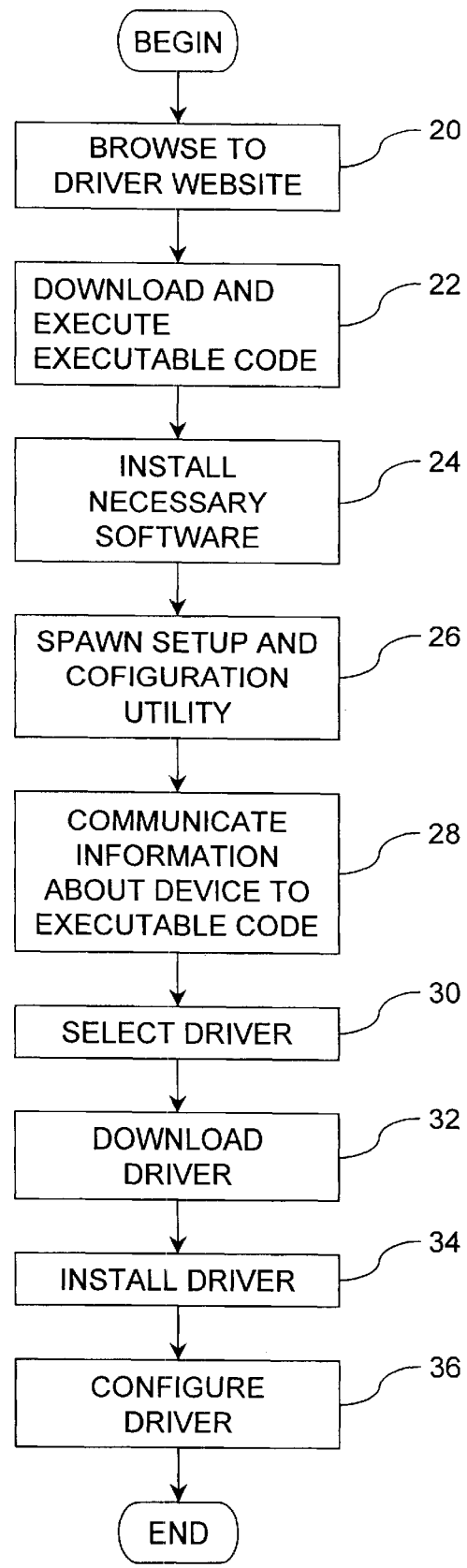
FIG. 2 is flow chart showing one embodiment of the present invention method.

FIG. 2 is a flow chart illustrating the method of the present invention. A user operates a browser on computer 4 to browse 20 to the website where the device driver is located. If the driver website is on internet server 16, the user may either connect to internet server 16 through computer 4 or intranet server 16.

The user may browse 20 to the driver website in any of several ways. First, the user may browse to the actual device if the device is capable of supporting its own website. The device website contains a link to the driver website. The link includes necessary parameters such as address, port number, and model name attached to the end of the URL for the driver website. When the user follows the link to the driver website these parameters are passed to the driver website.

Alternatively, the user may browse to a website of a local administrator. The local administrator website contains a link to the driver website. This link also includes the necessary parameters attached to the end of the URL for the driver website. When the user follows the link to the driver website these parameters are passed to the driver website.

The user may instead browse 20 directly to the driver website. No parameters are automatically passed to the driver website if the user browses directly to the driver website. However, the user may manually type in the parameters.

Any conventional browser may be used to browse to the website as long as the browser supports applet code. For the purpose of clarity, applet code is any code that allows the website some control over the computer.

At the website, the browser downloads and then executes 22 executable code. The executable code may be in the form of applet code. The executable code installs 24 any required software to the client. This may include client-to-device communication software as well as a setup and configuration utility which may also be part of the downloaded executable code. The installation takes place only if the necessary software does not already exist on the client or if a new version of the software is available.

Next, the executable code spawns 26 the setup and configuration utility on the client system. Information about the device is then communicated 28 to the executable code, or the setup and configuration utility portion of the executable code. The information about the device may either be input directly by the user, or may be passed from the browser to the executable code. The information passed as parameters to the driver website may be passed to the executable code from the browser.

In one embodiment, the information passed to the executable code from the user or the browser is only address information about the device. The executable code then queries the device to learn more detailed information about the device such as its model. Alternatively, the user or the browser may provide the more detailed information directly to the executable code.

The executable code uses the information about the device to select 30 a driver from the device. If more than one driver exists for the device, the executable code may either select 30 the best driver for the device or provide a list to the user for the user to select 30 a driver.

Once the driver has been selected 30, the driver is downloaded 32 from the driver website and installed 34 on the client (computer 4). If necessary, the executable code also configures 36 the driver so that it functions properly with the client's hardware and software configuration.

The present invention system and method allow a device driver to be easily installed using a web browser. No special software is needed for the driver installation other than a standard web browser. Since the drivers are available through the internet, drivers may be updated immediately when they are released by the vendor or manufacturer.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for installing a device driver for a device, the method comprising:
   (a) using the browser to browse to a network administrator website for the device, the network administrator website having a link to the driver website;
   (b) using the browser to browse through the link to a driver website;
   (c) the browser downloading executable code from the driver website;
   (d) the browser executing the downloaded executable code;
   (e) communicating to the downloaded executable code information about the device
   (f) selecting a device driver for the device; and,
   (g) the downloaded executable code installing the selected driver.

2. The method of claim 1 further including the browser receiving information about the device from another website and wherein communicating to the downloaded executable code includes the browser communicating the information about the device to the downloaded executable code.

3. The method of claim 1 wherein communicating to the downloaded executable code includes a user providing the information to the downloaded executable code.

4. The method of claim 1 wherein selecting the driver for the device includes the downloaded executable code selecting a best driver for the device.

5. The method of claim 1 wherein selecting the driver for the device includes:
   (a) the downloaded executable code building a list of available drivers for the device from available drivers stored at the website; and,
   (b) a user selecting one of the drivers from the list of available drivers.

6. A system for installing a device driver for a device, the system comprising:
   (a) means for browsing to a network administrator website for the device, the network administrator website having a link to the driver website;
   (b) means for browsing through the link to a driver website;
   (c) browser means for downloading executable code from the driver website
   (d) means for executing the downloaded executable code;
   (e) means for communicating to the downloaded executable code information about the device;
   (f) means for selecting a device driver for the device; and,
   (g) downloaded executable code means for installing the selected driver.

7. The system of claim 6 further including means for the browser receiving information about the device from another website and wherein means for communicating to the downloaded executable code includes means for the browser communicating the information about the device to the downloaded executable code.

8. The system of claim 6 wherein the means for communicating to the downloaded executable code includes means for a user providing the information to the downloaded executable code.

9. The system of claim 6 wherein the means for selecting a device-driver includes downloaded executable code means for selecting a best driver for the device.

10. The system of claim 6 the means for selecting a device driver includes:
    (a) downloaded executable code means for building a list of available drivers for the device from available drivers stored at the website; and,
    (b) means for a user selecting one of the drivers from the list of available drivers.

11. A program storage device readable by a computer, tangibly embodying a program, applet, or instructions executable by the computer to perform method steps for installing a device driver for a device, the method steps comprising:
    (a) the program, applet, or instructions browsing to a network administrator website for the device, the network administrator website having a link to a driver website;
    (b) the program, applet, or instructions browsing through the link to the driver website;
    (c) downloading executable code from the driver website;
    (d) executing the downloaded executable code;
    (e) communicating to the downloaded executable code information about the device
    (f) selecting a device driver for the device; and,
    (g) the downloaded executable code installing the selected driver.

12. The program storage device of claim 11 further including the step of the program, applet, or instructions receiving information about the device from another website and wherein the step of communicating to the downloaded executable code includes the program, applet, or instructions communicating the information about the device to the downloaded executable code.

13. The program storage device of claim 11 further including the step of communication to the downloaded executable code includes a user providing the information to the downloaded executable code.

14. The program storage device of claim 11 wherein the step of selecting a device driver for the device includes:
    (a) the program, applet, or instructions building a list of available drivers for the device from available drivers stored at the website; and,
    (b) a user selecting one of the drivers from the list of available drivers.

* * * * *

UNITED STATES PATENT AND TRADEMARK OFFICE
CERTIFICATE OF CORRECTION

PATENT NO.   : 6,594,690 B2
DATED        : July 15, 2003
INVENTOR(S)  : Charles E. Cantwell It is certified that error appears in the above-identified patent and that said Letters Patent is hereby corrected as shown below:

Column 1,
Line 54, after "operate" insert -- . --

Column 2,
Line 20, after "server" delete "16" and insert therefor -- 6 --

Column 4,
Line 2, after "website" insert -- ; --
Line 21, delete "device-driver" and insert therefor -- device driver --
Line 44, after "device" insert -- ; --
Line 56, delete "communication" and insert therefor -- communicating --

Signed and Sealed this

Eleventh Day of January, 2005

JON W. DUDAS
*Director of the United States Patent and Trademark Office*